United States Patent [19]

Filion et al.

[11] Patent Number: 6,119,156
[45] Date of Patent: Sep. 12, 2000

[54] LOCKING MECHANISM FOR NETWORK-MANAGED AGENTS IN A DIGITAL PRINTING SYSTEM

[75] Inventors: Joseph L. Filion, Fairport, N.Y.; Paul B. Gloger, San Marino; Gary Padlipsky, Hawthorne, both of Calif.

[73] Assignee: Xerox Corporation, Stamford, Conn.

[21] Appl. No.: 09/067,646

[22] Filed: Apr. 27, 1998

[51] Int. Cl.[7] .................................................. G06F 15/16
[52] U.S. Cl. ........................ 709/220; 709/223; 709/202
[58] Field of Search .................................... 709/204, 205, 709/213, 215, 220, 202, 201, 223, 224, 225; 707/207

[56] References Cited

U.S. PATENT DOCUMENTS

| | | | |
|---|---|---|---|
| 5,263,155 | 11/1993 | Wang | 707/8 |
| 5,367,635 | 11/1994 | Bauer et al. | 709/221 |
| 5,602,973 | 2/1997 | Nishiwaki | 358/1.14 |
| 5,638,511 | 6/1997 | Nezu | 395/187.01 |
| 5,675,741 | 10/1997 | Aggarwal et al. | 395/200.12 |
| 5,710,908 | 1/1998 | Man | 395/500 |
| 5,717,950 | 2/1998 | Yamaguchi | 710/8 |
| 5,740,368 | 4/1998 | Villalpando | 709/202 |
| 5,838,325 | 11/1998 | Deen et al. | 345/353 |
| 5,850,517 | 12/1998 | Verkler | 709/202 |
| 5,913,213 | 6/1999 | Wikstrom et al. | 707/8 |
| 5,956,160 | 9/1999 | Watanabe | 358/496 |

FOREIGN PATENT DOCUMENTS

0529787 A2   3/1996   European Pat. Off.   ............... 431/317

*Primary Examiner*—Zarni Maung
*Attorney, Agent, or Firm*—R. Hutter

[57] ABSTRACT

In an SNMP-based network management system, an agent within the system maintains a quantity of memory which serves as a "lock table." The lock table is a set of object identifiers (OID's) relating to objects associated with the agent. When a manager on the network requests a particular object associated with the agent, the agent retains the OID of the object in the lock table. If another manager simultaneously wishes to set an object associated with the agent, the OID of the proposed object is compared to any OID currently in the lock table, and if the proposed object intersects with one of the objects in the lock table, access to the object is denied. The method permits locking of specific objects, while leaving other objects associated with the same device available to others.

7 Claims, 3 Drawing Sheets

LOCKING MECHANISM FOR NETWORK-MANAGED AGENTS IN A DIGITAL PRINTING SYSTEM

FIELD OF THE INVENTION

The present invention relates to network management software such as would be used, for example, in a networked printing environment using SNMP (Simple Network Management Protocol).

1. Background of the Invention

Simple Network Management Protocol, or SNMP, is a well-known standard for network management software. A typical application of network management software would be a networked printing environment, wherein there exists on a common network any number of data producers, such as computers, scanners, facsimiles, and the like, as well as one or more output devices, typically digital printers. In more general terms, in a network printing context, the computers, operated by one or more systems administrators, can be considered "managers" while the output devices can be considered "agents," using the standard terminology of SNMP.

In the SNMP network management terminology, a network management system contains at least one network management station, several managed nodes, each containing an agent, and a protocol which is used by the manager and the agents to exchange management information. A user can obtain data and alter data on the network by using network management software on the manager to communicate with agent software in the managed nodes.

An agent is software running as a background process on each of the target devices, such as a digital printer. When a user requests management data from a device on the network, management software will send an object identification in a management packet or frame to the target agent. The agent interprets the object identifier, retrieves data associated with the object identifier, and sends the data in a packet back to the user. A corresponding process may be invoked to retrieve data.

SNMP defines a structure for a management database (a collection of objects), called the management information base, or MIB. Objects in a MIB have names, called object identifiers (or OIDs), and object types. An object identifier, or OID, is a sequence of non-negative integer values which signify a path through a tree structure of numbered branches (called sub-identifiers, or subtrees). For example, the object identifier 1.3.6.1.4.1.253.2.12 identifies an object found by starting at the root, moving to the branch with the sub-identifier 1, moving to a subordinate branch with the sub-identifier 3, and so forth. In the present example, the branch identified by the first five sub-identifiers, 1.3.6.1.4, is the standard SNMP defined branch called "private." The next sub-identifier, 1, is for a branch called "enterprises" which is reserved for vendor-specific objects. The next label in the sequence is reserved for specific vendors, each vendor having its own label, such as 253 for Xerox.

In SNMP, information is retrieved from an agent (such as a digital printer) by a manager (such as the PC of a systems administrator) sending a GET or GET-NEXT request with an object identification as a parameter. Data associated with an object can be altered by sending an SNMP SET request to the agent with the object identification as one parameter and the data as another parameter. An object which can be written to is called a "settable" object.

2. Description of the Prior Art

In the prior art, U.S. Pat. No. 5,367,635 discloses an SNMP-based network management system in which users can add new user defined management objects to an agent. A user editable text file defines object identifications, object types, and the path and name of associated executable software. A user can then invoke user defined executable software at a manage node by sending a network command and a user defined OID to the agent in the manage node.

U.S. Pat. No. 5,638,511 discloses a method of maintaining security in a print server. An output request unit serving as a client sends a job to be processed to an output unit such as a print server. The output unit accepts and puts the job in a queue. The output unit creates a collation key and sends it to the output request unit, which stores the collation key in a storage medium. The output unit searches the storage medium for the collation key, and if the output unit finds the collation key, it processes the queued job corresponding to the collation key.

U.S. Pat. No. 5,675,741 discloses a method for determining a communications path between a source and a destination in a internet protocol network. The method determines a path list of next-hop routers between the source and destination by selecting between an SNMP query of a current router on the path, and by sending a probe-packet having a destination field with a destination IP address and a field with a value of one greater than the number of hops to the current router. The steps are iterated until the next router is determined to be the destination.

U.S. Pat. No. 5,710,908 discloses a protocol-independent method of transmitting a data packet over a LAN. A program is initialized which determines which protocols are available for use, assigns an access line to each protocol that is available to the application program on a first device, and creates mapping information that indicates a correspondence between an access ID/access line pair and a block of protocol-specific information.

SUMMARY OF THE INVENTION

According to one aspect of the present invention, there is provided, in a computer network management system comprising at least one manager and at least one agent, the agent including a memory for retaining a lock table, a method in which the manager sends a proposed object identifier to the agent. The agent compares the proposed object identifier to at least one locked object identifier retained in the lock table. If the proposed object identifier intersects a locked object identifier in the lock table, the agent does not return an object to the manager.

According to another aspect of the present invention, there is provided an agent for use in a computer network management system comprising at least one manager and at least one agent. A memory retains a lock table. Means are provided for receiving a proposed object identifier over a network and comparing the proposed object identifier to a locked object identifier retained in the lock table.

According to another aspect of the present invention, there is provided a digital printer connectable over a network, comprising an agent for use in a computer network management system having at least one manager and at least one agent. A memory associated with the agent retains a lock table. Means are provided for receiving a proposed object identifier over a network and comparing the proposed object identifier to a locked object identifier retained in the lock table.

DETAILED DESCRIPTION OF THE INVENTION

Figure 1:
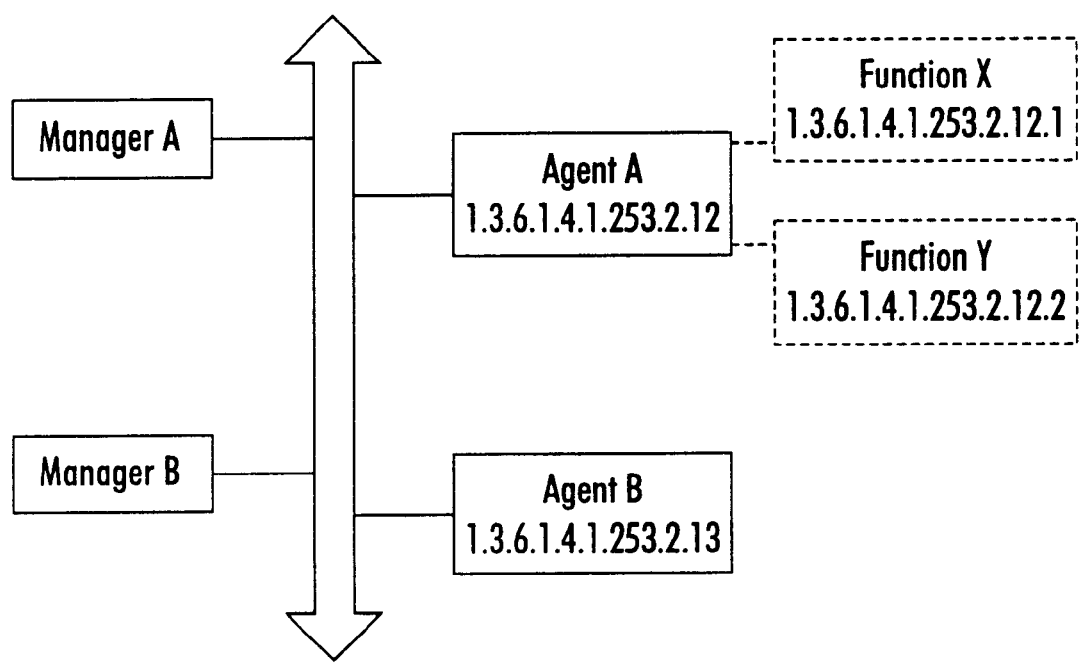
FIG. 1 is a diagram showing a general relationship of managers and agents in a SNMP-based computer network.

FIG. 1 is a simple diagram showing two managers, Manager A and Manager B, sharing a network with two agents, Agent A and Agent B. In the network printing context, Manager A and Manager B could represent two different systems administrators, each being capable of setting objects in Agent A or Agent B. If Agent A represents the agent running on a device such as a digital printer, the various objects which could be set in the agent could relate to the configuration of the printing apparatus or its ancillary equipment, such as checking the status of one or more paper trays, activating or disabling a mailbox or stapler, determining if there exists sufficient toner of various colors, etc., or could relate to network aspects of the printing device, such as the TCP/IP or Netware settings of the device. ("Netware" is a trademark of Novell Corp.)

As shown in FIG. 1, it is conceptually possible, with SNMP, to separate objects relating to different functions of the device. As shown in FIG. 1, Agent A may include therein a function X which may consist of objects relating to the physical configuration of the printer, and a function Y, which consists of objects relating to the network settings of the printer. The function X and function Y, in OID terms, can be represented by different "branches" or "subtrees" in the MIB. Thus, while all communications from Manager A or Manager B reaching Agent A will have an identical series of identifiers up to a point, at some very low level of the subtrees, subtrees can split off to address different specific functions within the printer. For example, if an object associated with the Agent A is identified by the OID 1.3.6.1.4.1.253.2.12, the object which relates to the configuration of the machine, such as function X, could be identified by 1.3.6.1.4.1.253.2.12.1, while the object which related to the network settings of the device could be identified by 1.3.6.1.4.1.253.2.12.2. It will be seen that these two OID's are identical up to the last branch, but the last node in the branch determines which function is being addressed by the manager using the OID. (In the present discussion, the particular OID is chosen as an illustrative example only, and is not intended to represent any OID in actual use.)

In the example of FIG. 1, another problem results when there are two or more managers, such as system administrators, on a network, each manager being capable of setting objects on a particular agent. Generally, in a "connectionless" network, it would be possible for either Manager A or Manager B to set objects in Agent A simultaneously, with possible self-canceling results. In order to avoid this problem, a standard practice is to design the MIB to have the capability to "lock" a subtree, with an object known as a "lock object." A particular manager, such as Manager A, can lock a subtree associated with Agent A, and as long as Manager A has the subtree for Agent A locked, any other manager in the system is locked out of setting any objects in the locked subtree associated with Agent A. In the prior art, the MIB must be designed with pre-defined subtrees that can be locked by setting a particular lock object.

One practical advantage of the use of "lock object" in SNMP is that, with regard to a particular agent, such as Agent A, locking of the subtree can only be "all or nothing."
In other words, once a Manager A locks the subtree for Agent A, another manager such as Manager B cannot access or set any object in the subtree. The present invention is directed toward a system in which the "lock object" concept can be directed not only to an agent such as Agent A as a whole, but can be directed to specific functions within Agent A, so that only a particular object need be locked at a particular time, leaving other functions within the agent capable of being set, such as by another manager.

Figure 2:
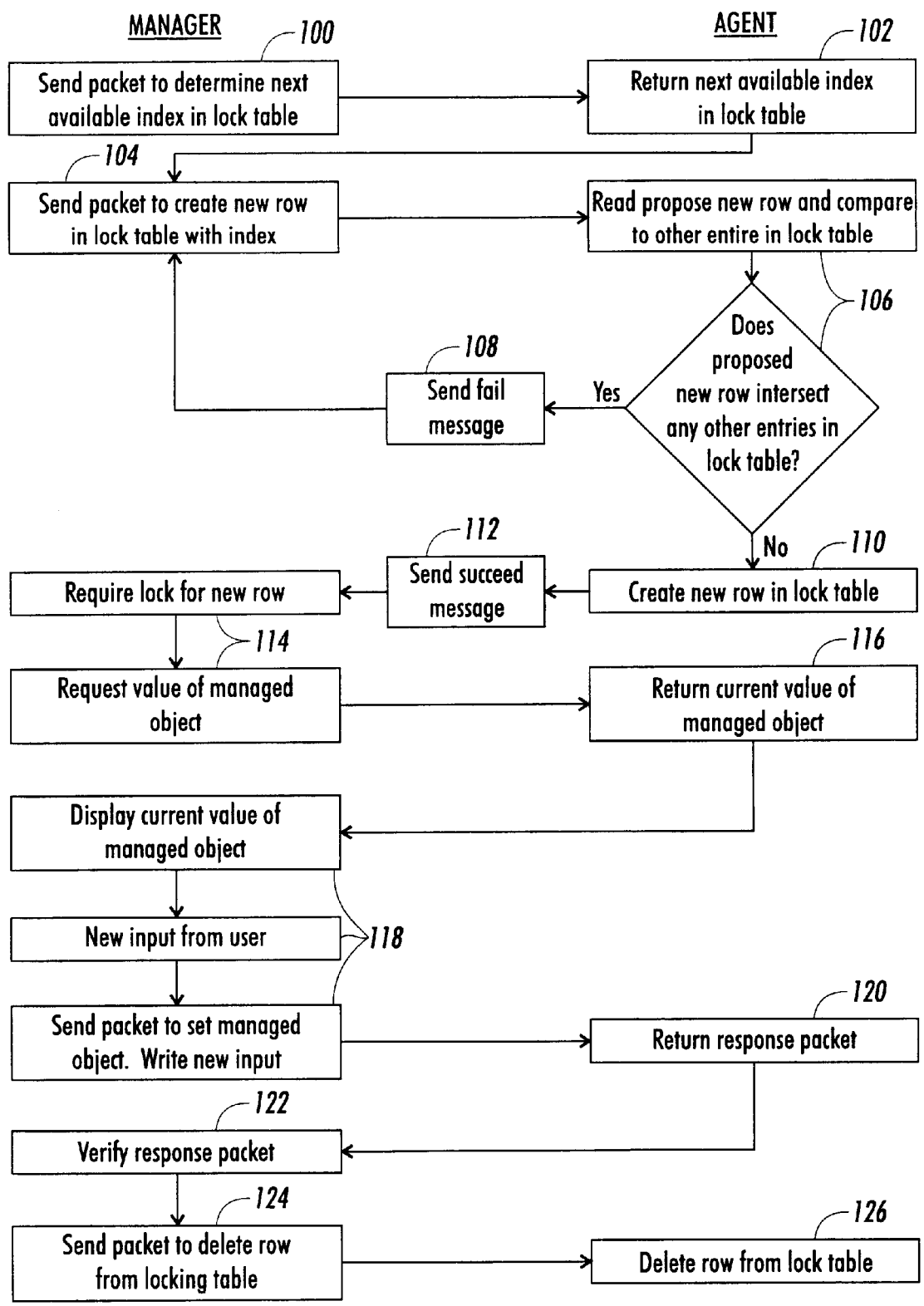
FIG. 2 is a set of parallel flowcharts showing the interaction between a manager and an agent according to the method of the present invention.

FIG. 2 is a flowchart, showing in parallel the operation of a manager and agent using the locking mechanism for a networked computing or printing environment such as shown in FIG. 1. In the parallel flowchart of FIG. 2, one manager, represented by the left side of the flowchart, interacts with one agent, as shown in the right side of the flowchart. However, as will become apparent in the detailed discussion below, the interaction between manager and agent is such that, if multiple managers are acting simultaneously on a single agent, the function of the agent will enable two or more managers to act on the agent simultaneously whenever possible, and when simultaneous operations on the agent are not possible, the agent will prevent additional managers from interacting with it.

According to the present invention, an agent on an SNMP network has associated therewith a small quantity of memory which can serve as what is herecalled a "lock table." This lock table includes a series of indices, each index corresponding to a row in the lock table. Each row in the lock table is capable of retaining the OID of a particular object associated with the agent. The agent further includes means for accepting a proposed object which a particular manager on the network would like to set (in the SNMP sense), and comparing the OID of the proposed object to one or more OID's stored in the lock table at a given time. This comparison of a proposed OID with any OID's in the lock table is basically a check, on the part of the agent, to make sure the proposed OID does not identify an object which is, at a particular time, locked because it is currently being set by another manager on the network. The interaction between the manager and agent in FIG. 2 thus shows in detail an instance of one manager proposing an object to be set, setting the object, and then terminating the interaction by freeing the object in question so it may be set by the manager itself or by another manager in the future.

With particular reference to the flowchart of FIG. 2, according to a preferred embodiment of the invention, a manager which intends to set a particular object on an agent first sends a packet to the agent to determine the next available index in the agent's lock table, that is, the next available location in memory into which the OID of the object can be accepted. The agent then returns the next available index in the lock table (step 102). Then, having received the index in the lock table from the agent, the manager sends a packet to the agent to create a new row in the lock table, this row having the OID of a particular object desired to be set by the manager (step 104). Once the agent receives this proposed new row from the manager, the agent reads this proposed new row and compares the OID in the new row to other entries which may be in the lock table (steps 106). Of course, if there are at a particular time no entries in the lock table, the proposed new row will not intersect any entry, every OID will be accepted, and therefore the manager can access any object associated with the agent. If, however, the proposed new row is inconsistent with, or intersects, the OID of one or more objects listed in the lock table, the agent sends a FAIL message back to the manager (step 108). In such a case, it is preferably up to the manager to try again at a later time, when perhaps the entries in the lock table will have changed and the proposed new row in the lock table will be accepted.

If, after checking the proposed new row with other entries in the lock table and finding that the new row is consistent (does not intersect) with any entry in the lock table, the agent creates a new row in the lock table (step 110) and sends a SUCCEED message to the manager (step 112). When this occurs, the manager locks the subtree associated with the OID in the new row, much in the manner of standard SNMP techniques, and then requests or alters at least one value of the object being managed in the agent (steps 114). In response, the agent returns the current value of the managed object in question (step 116).

What follows is a typical instance of setting a value within an object associated with the agent, as is known in SNMP. The manager receives the current value in question of the managed object, then, in response to new input from the user (whatever that user might be), sends a packet to the agent setting the managed object (such as with a SET command in SNMP) to the object with respect to the new input (steps 118). The agent then returns a response packet to the manager (step 120) which is then verified by the manager (step 122). Finally, according to the present invention, the manager sends a packet to the agent, instructing the agent to delete the row having the OID of the object from the locking table (step 124), and, in response thereto, the agent deletes the row from the lock table (step 126).

It can be seen, from the above demonstration of the flowchart of FIG. 2, that every transaction between a manager and agent according to the present invention requires, first, a check on the part of the agent to see if a proposed OID is inconsistent with, or intersects, an OID already in its lock table; and once an object is accessed, the OID of the object is retained in the lock table to prevent other managers from setting a value in the object at the same time. The particular advantage of the present invention derives from the fact that, using the method of the present invention, locking of an object associated with an agent can be made specific to a particular object. In the prior art, in contrast, a "lock object" command in standard SNMP will lock every value of a particular object, or lock an entire agent with respect to other managers once one manager on a network locks the agent. With the present invention, however, the OID's which are retained on the lock table of the agent at a particular time can be made general or specific depending on the specific OID entered into the lock table at a particular time. In effect, the present invention allows one object of an agent to be set by one manager simultaneously with a second object on an agent being set by a second manager; as long as the two objects do not have intersecting OID's, the system of the present invention will permit this.

Returning to steps 108 and 112 mentioned above, it will be noted that, in the illustrated embodiment of the invention, the manager is programmed to "obey" a FAIL or SUCCEED message from the agent: the manager responds to a SUCCEED message in one way and to a FAIL message in another. Thus, in this embodiment, software in the manager must cooperate with software in the agent to carry out the invention; the invention must be manifest in software preloaded in at least one manager and agent on a network. However, according to an alternate embodiment of the invention, the software necessary to carry out the invention could be resident entirely on the agent, so that an agent could carry out the invention regardless of whether a manager on the network was loaded with any particular software. In brief, such an agent would have software that would prevent the returning of any packets (or packets of a particular type, or for a particular period of time) by the agent to a manager that requested a locked OID.

Figure 3:
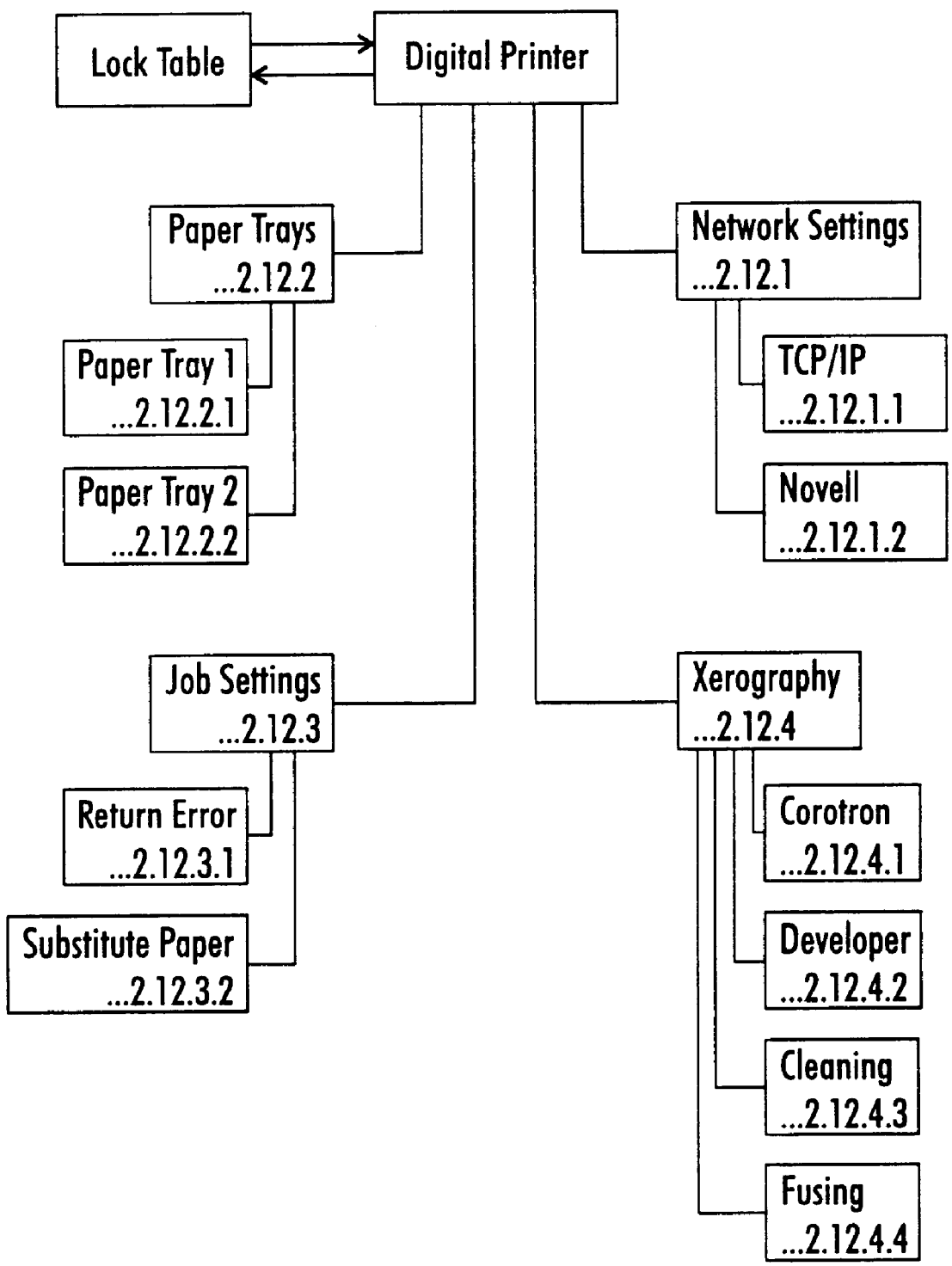
FIG. 3 is an SNMP-based construction of functions of a digital printer, in accordance with the present invention.

The capability afforded by the present invention is particularly useful in the context of managing a combination hardware/software device, such as a digital printer or other output device, which is resident on a network. In the case of a sophisticated digital printer, which may include multiple paper trays, different finishing options such as sorting and stapling, sophisticated print job queuing procedures, and network settings, there may readily exist any number of objects representing different functions of the digital printer. FIG. 3 is a diagram showing objects for controlling an example digital printer having different subsystems, each of which could be addressed by an individual settable object under SNMP. As construed in the SNMP scheme, the basic identification of a particular device such as a digital printer is based on one particular OID, although typically functions within a device are addressed through a tree of OID's unrelated to the OID identifying the device itself. The device includes a memory for retaining the lock table, as shown.

In order to address specific subsystems within the digital printer as shown, such as the paper trays, job settings, network settings, and in this case xerographic settings, the OID is modified by the addition of labels, which represent nodes in a subtree. In this particular example, the objects for the network settings have an OID ending in label .1; going further down the tree, the TCP/IP settings for the digital printer add a further label to end in .1.1, while the Netware settings, being a different branch of the same subtree, end in .1.2. Similarly, with regard to the paper trays, while the paper trays in general may be addressed by an OID such as ending in .2, specific paper trays add further nodes in the subtree, such as paper tray 1 ending in .2.1 and paper tray 2 ending in .2.2. The same principle applies to other subsystems within the digital printer. With reference to the claims below, the phrase "physical configuration" shall mean a setting which affects the physical operation of the digital printer, such as the behavior of the xerographic elements or the paper trays, etc., or managing job data as they relate to the physical operation; and "network settings" shall mean the settings which affect how the printing apparatus interface with the network in various ways, such as TCP/IP or Netware settings, etc. The phrase "digital printer" shall include any document output device or portion thereof, such as a xerographic or ink-jet printer, multifunction device, facsimile, digital copier, or even a CRT or screen which displays documents, or a scanner which converts hard-copy originals to digital image data.

It can thus be seen, combining the SNMP construction of digital printer in FIG. 3 with the method as described in FIG. 2, that, by proper selection of OID's for a manager to address only those portions of the digital printer which are of immediate interest, while avoiding locking out other portions of the digital printer which are not of immediate interest. For instance, if there are two systems administrators acting as managers on the network, one system administrator being concerned with the physical readiness of the digital printer (such as the paper trays and xerography), with another system administrator being interested in the network settings of the digital printer, the system administrator A can use the system of the present invention to access and set the objects such as involving the paper trays and xerography, such as by using the OID's which end in 2.12.2 or 2.12.4, without unnecessarily locking out, for example, the OID's for the objects involving network settings, which would end in 2.12.1. If system administrator B wanted to set the network settings of the digital printer while system administrator A set objects involving the paper trays, it is apparent that a comparison of the OID's in the lock table associated with the digital printer (as shown in FIG. 3) would permit this simultaneous setting of objects having non-intersecting OID's. If, of course, a particular system administrator wanted for some reason to lock out the objects of the digital printer entirely, he could just propose the OID associated with the highest-level subtree associated with the printer, which by the nature of the MIB structure, would lock out all of the branches of the tree after the digital printer itself.

The system of the present invention allows the manager to lock individual objects, groups of objects, or the entire address space. The system of the present invention provides a relatively efficient, selectively precise locking mechanism of desired portions of the tree, still leaving most of it unlocked and available to others. Significantly, while prior art arrangements require the MIB designer to pre-arrange specific subtrees which can be locked by setting a lock object, the system of the present invention allows individual subtrees to be locked with complete freedom, at broad or very specific levels.

While the invention has been described with reference to the structure disclosed, it is not confined to the details set forth, but is intended to cover such modifications or changes as may come within the scope of the following claims.

What is claimed is:

1. A digital printer connectable over a network, comprising
    a first function settable via a first object having a first object identifier and a second function settable via a second object having a second object identifier different from the first object identifier, at least one of the first function and the second function relating to a physical configuration of the digital printer; and
    an agent for use in a computer network management system comprising at least one manager and at least one agent, the agent including
       a memory for retaining a lock table,
       means for receiving a proposed object identifier over a network, and
       means for comparing the proposed object identifier to a locked object identifier retained in the lock table.

2. The digital printer of claim 1, the agent further including means for entering the proposed locked object in the lock table if the proposed object identifier does not intersect a locked object identifier in the lock table.

3. The digital printer of claim 2, the agent further including means for deleting the proposed locked object identifier from the lock table in response to a command received over the network.

4. The digital printer of claim 1, the first object and the second object being simultaneously settable.

5. The digital printer of claim 1, the first object being settable when the second object is locked.

6. The digital printer of claim 1, the first function relating to a physical configuration of the digital printer, and the second function relating to a network setting of the agent.

7. The digital printer of claim 1, the first function relating to a first physical configuration of the digital printer, and the second function relating to a second physical configuration of the digital printer.

* * * * *